UNITED STATES PATENT OFFICE.

CHRISTOPHER RIS, OF BASLE, SWITZERLAND, ASSIGNOR TO JOHN R. GEIGY & CO., OF SAME PLACE.

BLACK TRIAZO DYE.

SPECIFICATION forming part of Letters Patent No. 571,933, dated November 24, 1896.

Application filed March 3, 1896. Serial No. 581,653. (Specimens.) Patented in France October 2, 1895, No. 250,697.

*To all whom it may concern:*

Be it known that I, CHRISTOPHER RIS, a citizen of the Swiss Confederation, residing at Basle, in the Republic of Switzerland, have invented certain new and useful Improvements in a Process for the Production of Black Triazo Dyes, (for which a patent of addition to original French Patent No. 250,697, dated October 2, 1895, was granted to me on January —, 1896,) of which the following is a specification.

This invention relates to the production of black triazo dyestuffs that possess considerable technical value because they yield upon unmordanted cotton pure-gray to deep-black shades of perfect fastness. Their chemical constitution corresponds to the following formula:

$$\text{Paradiamin} \begin{cases} \text{alkylated beta}_1\text{-alpha}_4\text{-amidonaphthol-beta}_3\text{-sulfo-acid} \\ \text{beta}_1\text{-alpha}_4\text{-amidonaphthol-beta}_3\text{-sulfo-acid-resorcin, (or metadiamin.)} \end{cases}$$

They are produced by diazotizing the mixed diazo dyestuff from one molecule of benzidin, (or tolidin or diamidoethoxydiphenyl or diamidodiphenol ether,) one molecule of an alkylated beta$_1$-alpha$_4$-amidonaphthol-beta$_3$-sulfo-acid and one molecule of the non-alkylated acid and combining the diazo compound thus formed with resorcin or metadiamin. The technical value of this reaction is based on the fact that the above-mentioned mixed diazo compound is only partially diazotizable, owing to which colors can be obtained which have much better properties than the products of a combination of a diazo dyestuff containing two molecules of the diazotizable non-alkylated amidonaphthol sulfo-acid. The latter possess a very inferior affinity to unmordanted cotton and a very insufficient solubility as compared with my new color.

The products obtained from the above-mentioned homologous or analogous substances give so similar results as to be practically equivalent.

The following may be given as an example of the production of the new coloring-matter: 75.6 kilos of the mixed diazo color obtained from one molecule of tetrazodiphenyl, one molecule of monoethyl beta$_1$-alpha$_4$-amidonaphthol-beta$_3$-sulfo-acid, and one molecule of the non-alkylated beta$_1$-alpha$_4$-amidonaphthol-beta$_3$-sulfo-acid are introduced in the form of a paste into one thousand liters of cold water. Then thirty-five kilos of hydrochloric acid of 21° Baumé are added and diazotized with seven kilos of nitrite of sodium. This diazo compound, after standing for several hours, is poured into a solution of eleven kilos of resorcin in about three hundred liters of water containing thirty kilos of carbonate of sodium. The coloring-matter, which forms a black precipitate, is filtered off, pressed, and dried. It forms a black powder, easily soluble in water with bluish-black color, soluble in concentrated sulfuric acid with grayish-blue color, and dyes unmordanted cotton gray to deep-black shades. By reducing agents, such as zinc powder and ammonia, a colorless solution is obtained.

Having thus described my invention, I claim as new and desire to secure by Letters Patent—

1. The process herein described of producing a black coloring-matter, which consists in diazotizing a mixed diazo dyestuff obtained from benzidin, an alkylated beta, alpha$_4$-amidonaphthol-beta$_3$-sulfo-acid and a non-alkylated beta$_1$-alpha$_4$-amidonaphthol-beta$_3$-sulfo-acid, and combining the diazo compound thus obtained with resorcin, substantially as set forth.

2. The new black triazo coloring-matter, being a black powder, easily soluble in water with bluish-black color, soluble in concentrated sulfuric acid with a grayish-blue color, decomposed by reducing agents to a colorless solution, and dyeing unmordanted cotton in gray to deep-black shades, substantially as set forth.

In testimony that I claim the foregoing as my invention I have signed my name in presence of subscribing witnesses.

CHRISTOPHER RIS.

Witnesses:
C. A. BURCKHARDT,
CHARLES BURCKHARDT,
GEORGE GIFFORD.